Patented Nov. 29, 1932

1,889,195

UNITED STATES PATENT OFFICE

WILLIAM HENRY ENGELS, OF RAHWAY, NEW JERSEY, ASSIGNOR, BY MESNE ASSIGN-
MENTS, TO MERCK & CO., INC., OF RAHWAY, NEW JERSEY, A CORPORATION OF NEW
JERSEY

IODINE PREPARATION

No Drawing.    Application filed May 9, 1927. Serial No. 190,140.

It has been found that while small amounts of free elementary iodine will quickly kill nematodes, as well as their eggs and larvæ, this result is not attained by metal iodides or other chemical combinations of iodine. Furthermore, for the destruction of nematodes in the intestines of animals the commonly used forms of elementary iodine, such as crystalline iodine, tincture of iodine or Lugol's solution, as well as the more recently described hyperactive crystalline iodine (Chandler, U. S. Patent #1,535,450) and the iodine suspensoid as obtained according to the specification of W. L. Chandler's co-pending application, Serial No. 70,697, filed November 21, 1925, are not suitable for effective use for internal administration because iodine thus administered combines too readily with the abundance of organic matter always present in the intestinal tract. W. L. Chandler, in another pending application, Serial #94,618 filed March 13, 1926, has disclosed an iodine vermicide preparation which overcomes the objections to such various forms of iodine and serves the purpose excellently. It is found, however, that in preparing an iodine vermicide according to the specifications of Chandler's last named application, about one-third of the iodine taken in operation is rendered inert through chemical combination, making the cost of this preparation unnecessarily high.

Essentially, the Chandler process referred to consists of the treatment of a suitable protein material with iodine only. In that process the iodine in part chemically combines with and in part is adsorbed to, the protein material. Only the adsorbed portion of iodine is available for the destruction of nematodes.

I have found, however, that about one-third of the quantity of iodine can be saved by first saturating the protein material with halogens other than iodine and, that by subsequent adsorption of iodine to these halogenized proteins, preparations are obtained which are fully as efficient as vermicides, as if iodine alone had been used according to the Chandler method.

In general my improved process consists of two major steps:

The first step consists in the treatment of a given protein material with a halogen other than iodine for the purpose of satisfying the affinity of the protein for halogen. The second step involves the further treatment of this resultant halogen-saturated protein material with iodine in such a manner that free elementary iodine will be adsorbed to it.

To obtain the halogenized protein material my preferred procedure is to cause a water solution or colloidal suspension of the protein to react with a predetermined quantity of a water solution of the given halogen. With most of the available proteins, a colloidal solution of the halogenized protein is formed. When these are then further treated with a suitable form of elementary iodine, the final product is usually obtained in the form of a very fine curd which can be readily suspended in water and will then give off the absorbed iodine again to water or to any other iodine-absorbing substance with which it might come in contact, whereas the chemically combined halogen will not be given off in any appreciable quantity.

I have not observed any toxic or other untoward effects when either bromine or chlorine are used for the preliminary saturation of the protein carrier of the iodine. Fluorine, on account of its relatively great toxicity and the technical difficulties involved in its use, is not recommended, especially as bromine and chlorine serve every practical purpose of efficiency and economy.

Among the readily available protein materials I have found especially the protein contained in eggs very suitable for this purpose; however the proteins contained in animal milk can also be used satisfactorily for the production of such compounds, as can also blood and meat albumins, gelatine and its derivatives, glue and nucleinic acid, and, in general, any protein material, animal or vegetable, which will combine with the given halogen and still retain the property of forming adsorption compounds with free iodine thereafter.

For the further step of adsorbing elementary iodine to the protein material which has been thus first saturated chemically with halogen other than iodine considerable latitude is permissible. Very satisfactory results are obtained by using the form of colloidal iodine which is prepared according to the co-pending application of Chandler (Serial #70,697) above mentioned. The microcrystalline black iodine which is obtained according to the specifications of U. S. Patent #1,535,450 can also be used. In that case, however, the complete adsorption of the iodine takes more time. Furthermore, I have found that tincture of iodine and solutions of iodine in potassium iodide solutions, as well as in other solutions of metal iodides, also will satisfactorily produce these adsorption compounds.

It is not necessary that iodine should be in the elementary condition before it is brought into contact with the already otherwise halogenized protein material. It is, for instance, quite expedient to mix these solutions of previously halogenized proteins with solutions containing metallic iodides and iodates in the proper proportions and to set the iodine free in these mixtures according to the well known reaction, by adding a mineral acid.

It is furthermore possible to use, as iodogenic compounds, substances which will easily give off free iodine under the influence of an oxidizing agent. For instance, in carrying out the second step of the process, the previously halogenized protein may be mixed with a solution of potassium iodide, and then chlorine gas can be introduced to set free elementary iodine in the solution, which then is adsorbed by the halogenized protein; or the iodine may be set free by any other oxidizing agent or by electrolysis.

In the production of these iodine adsorption compounds by this new process, practically all of the added iodine is available as free iodine, because the previously halogenized protein will not take up any appreciable quantity by chemical combination. The halogenized bromine and chlorine protein compounds, which have thus subsequently been made to adsorb iodine, in themselves appear to be inert as to anthelmintic action, but it has been found that they do not interfere with it, nor are they harmful to the host, and the use of these halogens, to chemically pre-saturate the specific protein materials employed, effects an economy, as their cost is considerably less than that of their equivalent of iodine.

The adsorption compounds produced with such halogenized protein materials vary somewhat in color from a dark yellow to brown or purple and are usually in the form of very fine precipitates, which easily can be suspended in water and which readily give off their adsorbed iodine when brought into contact with water or other materials which have a sufficient affinity for it.

In order to illustrate more clearly the process, I give the following examples:

*Example #1.*—12 kilogrammes of egg albumin are dissolved in 150 liters of water. To this is added, while stirring, a solution of 3.85 kg. bromine in 250 liters water. The mixture is allowed to stand for several hours. To the resultant colloidal solution of the brominized egg albumin, 300 liters of a 4% water suspension of colloidal iodine is then added under stirring. A purplish brown suspension results which on titration shows the presence, in the free state, of practically all the iodine which has been taken in operation. This mixture is diluted to any desired strength, by adding appropriate quantities of water.

*Example #2.*—To 510 kg. of skim milk add a solution of 3.35 kg. of bromine in 100 liters of water while stirring. The resulting mixture is allowed to stand over night and is then mixed with 10.7 kg. of microcrystalline iodine as obtained according to the specifications of U. S. Patent #1,535,450. The resulting product is a suspension which has substantially all of the bromine in chemical combination with the protein while substantially all of the iodine used is present in the free state.

*Example #3.*—16 kilogrammes of blood albumin are dissolved in 200 liters of water. To this is added, while stirring, a solution of 2.3 kg. chlorine in 350 liters of water. After standing for 24 hours at room temperature, the resultant colloidal solution of this halogenized blood albumin is diluted with 150 liters of water. Thereupon a solution of 16 kgs. of iodine in 250 liters of alcohol is added slowly while stirring. A purplish-brown suspension is obtained which on assay shows the presence, in the free state, of practically all the iodine taken into operation.

The quantity of halogen necessary to fully saturate the chemical affinity of the protein for halogens, varies, of course, with the specific properties of the particle protein material used. Similarly, there will be some variation in the amount of iodine that can be adsorbed to the pre-halogenized material, but in general it will be possible to adsorb an amount of iodine approximately equal in weight to the amount of the original protein material taken.

The given examples, as set forth, are understood to be merely by way of illustration and not of limitation, as obviously much variation is possible in the selection of the protein material, the halogen, and the form in which the iodine is to be applied, without departing from the scope of the invention.

Having thus set forth the essentials of my invention, what I claim as new and for which I desire to secure Letters Patent is:

1. The process for the production of iodine adsorption compounds consisting in the treatment of a protein with a halogen other than iodine to a point of substantially complete chemical saturation, and the subsequent adsorption of elementary iodine to the halogenized protein.

2. The process involving the production of iodine adsorption compounds consisting in the treatment of a protein with a halogen other than iodine until the protein is substantially chemically saturated with respect to the said halogen, then adding a solution of iodine compounds, and setting free the iodine contained in such mixture by an oxidizing agent.

3. The process involving the adsorption of free iodine consisting of the steps of first treating a protein material with a halogen other than iodine to the point of chemical saturation of said protein with the said halogen and subsequently treating the halogenized substance thus produced with elementary iodine.

4. The process of treating protein material with a halogen other than iodine to saturate substantially completely the halogen affinity of such protein and then to adsorb iodine to the said halogenized protein compound from a solution of iodine in a solution of metal iodide.

5. As a new article of manufacture, a vermicide comprising a protein substantially completely chemically saturated with halogen, other than iodine, or fluorine, and adsorbed iodine.

6. A vermicide comprising a protein material, substantially completely chemically saturated with halogen, other than iodine or fluorine, and adsorbed elementary iodine.

7. A vermicide composition containing protein with chemically combined bromine and adsorbed free iodine.

8. A vermicidal iodine composition comprising protein containing chemically combined chlorine and adsorbed iodine.

9. The process of producing an iodine vermicide comprising the treatment of albumin with a freshly prepared aqueous solution of chlorine containing a sufficient quantity of the latter to saturate the affinity of the albumin; then treating the resulting chlorinized albumin compound with an aqueous suspension of micro-crystalline iodine containing a quantity of the latter substantially equal in weight to the quantity of the albumin, stirring the mixture until substantially all the iodine has been adsorbed to the chlorinized albumin, substantially as described.

10. The process of producing an iodine vermicide comprising the treatment of a protein with an aqueous solution of halogen other than iodine containing a sufficient quantity of such halogen to saturate the affinity of the protein; then treating the resulting halogenized protein compound with an aqueous suspension of micro-crystalline iodine containing a quantity of the latter substantially equal in weight to the quantity of the protein, stirring the mixture until substantially all the iodine has been adsorbed to the halogenized protein, substantially as described.

11. The process for the production of iodine adsorption compounds consisting in the treatment of a protein with chlorine in solution until the protein has been substantially chlorinized, and the subsequent adsorption of elementary iodine to the resulting chlorinized protein.

12. The process involving the adsorption of free iodine by treating a protein, which has previously been chemically saturated with chlorine with a form of elementary iodine in solution.

WILLIAM HENRY ENGELS.